United States Patent [19]

Leonard et al.

[11] 3,855,095

[45] Dec. 17, 1974

[54] ELECTROCHEMICAL ELECTRODE ASSEMBLY AND METHOD OF MAKING SAME

[75] Inventors: Lynn B. Leonard, Fullerton; Arne J. Petersen, Balboa, both of Calif.

[73] Assignee: Beckman Instruments, Inc., Fullerton, Calif.

[22] Filed: Jan. 13, 1969

[21] Appl. No.: 791,881

Related U.S. Application Data

[63] Continuation of Ser. No. 518,247, Jan. 3, 1966, abandoned.

[52] U.S. Cl............... 204/195 G, 65/36, 65/40
[51] Int. Cl............... C03b 23/00, G01n 27/36
[58] Field of Search............... 204/1.1, 195, 195.1; 65/36, 40, 42, 45, 46

[56] References Cited
UNITED STATES PATENTS 2,755,243   7/1956   Beckman et al................ 204/195.1
3,188,285   6/1965   Watanabe et al................ 204/195
3,226,313   12/1965  Riseman ........................ 204/195.1

FOREIGN PATENTS OR APPLICATIONS 667,471     3/1952   Great Britain
1,090,451   10/1960  Germany Primary Examiner—T. Tung
Attorney, Agent, or Firm—J. G. Mesaros; R. J. Steinmeyer

[57]  ABSTRACT

A glass electrode assembly including inner and outer glass tubes in which the internal half cell of the electrode is sealed by a glass seal to the inner tube close to the ion sensitive bulb by means of wave energy, rather than a gas flame, so as to avoid contamination of electrolyte in the electrode.

7 Claims, 10 Drawing Figures

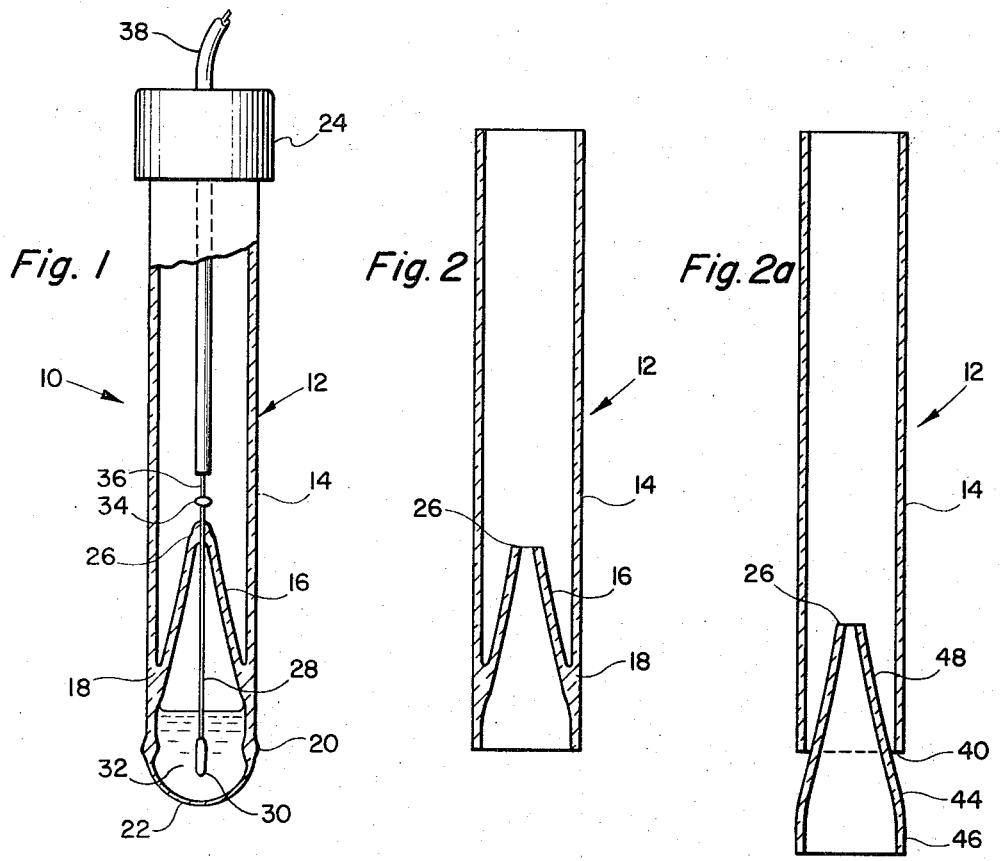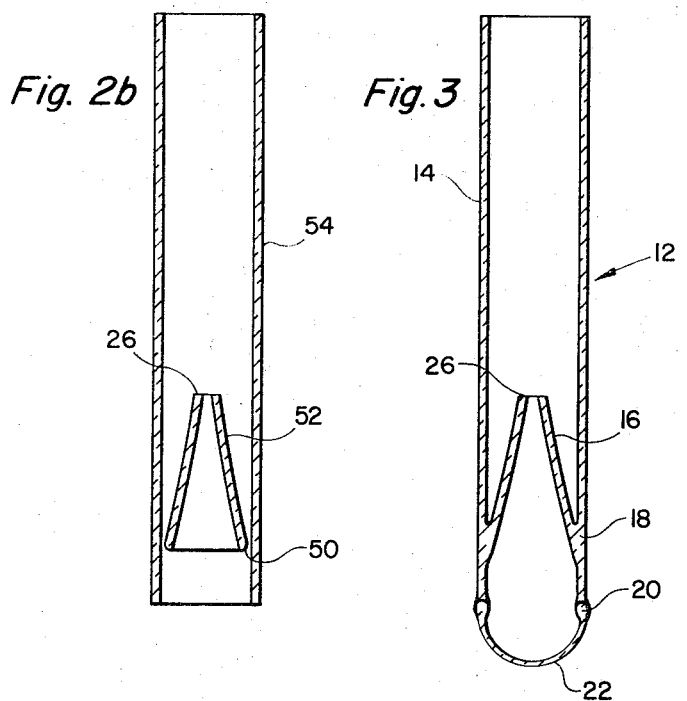

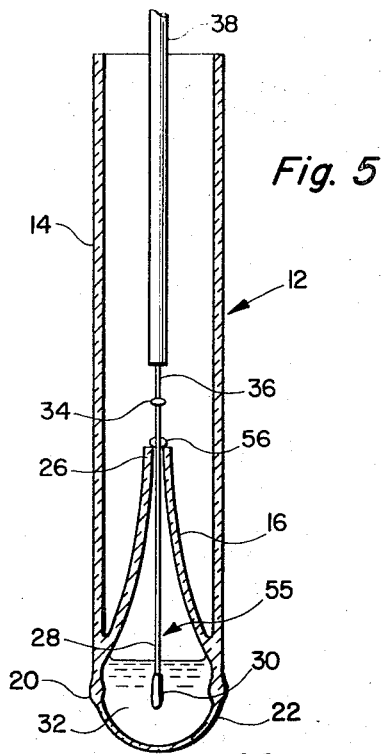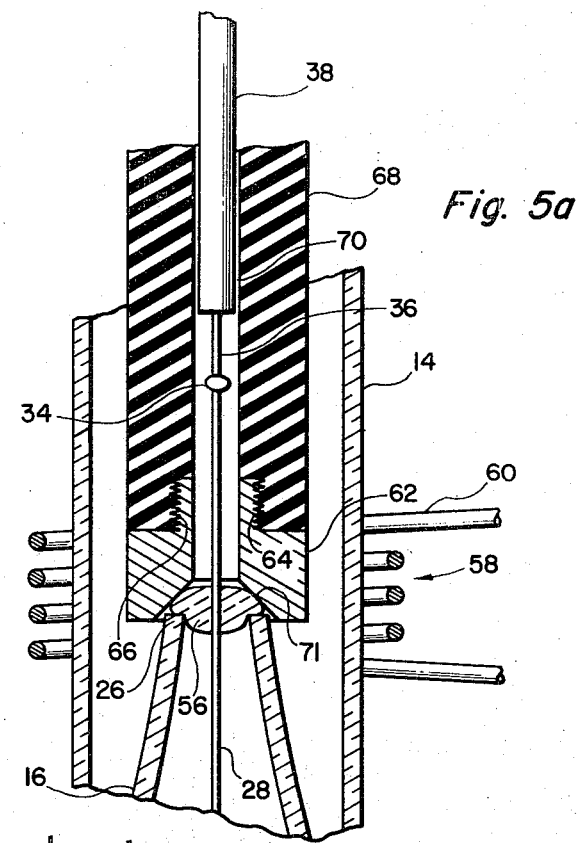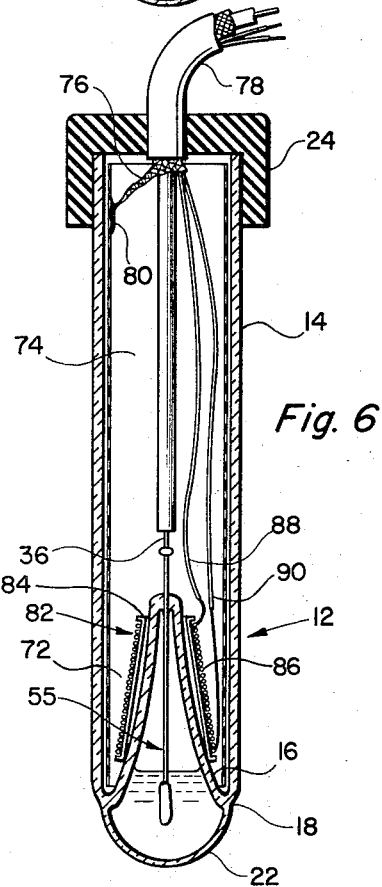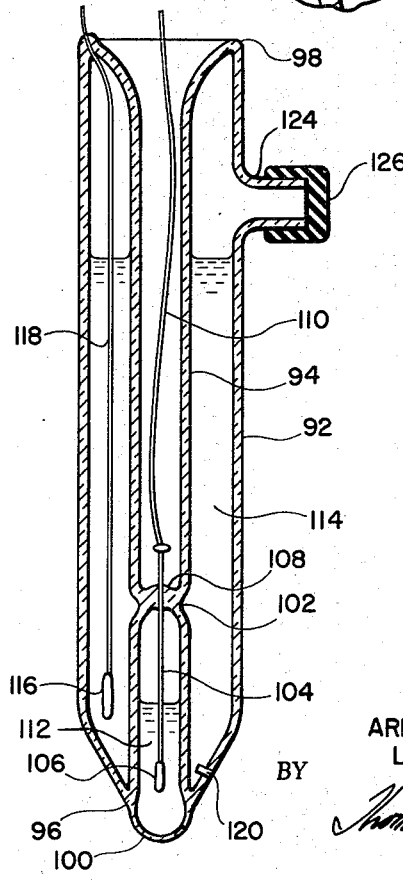

ELECTROCHEMICAL ELECTRODE ASSEMBLY AND METHOD OF MAKING SAME

This application is a continuation of our copending application Ser. No. 518,247, entitled "Electrochemical Electrode Assembly and Method of Making Same," filed Jan. 3, 1966, assigned to the same assignee as the present application, and now abandoned.

This invention relates to an electrochemical electrode assembly, and more particularly, to such an assembly for measuring the ionic concentrations of solutions and the method of making the assembly.

Typical electrode assemblies for measuring the ionic concentration of solutions are glass electrodes which comprise a tubular glass stem having a bulb of ion sensitive glass sealed thereto and an internal half-cell positioned in the stem. The half-cell is immersed in an electrolyte solution contacting the inner surface of the bulb.

It is desired in some instances to permanently seal the electrolyte in place in the glass electrode so that the electrode assembly may be used without the necessity of replenishing the electrolyte. A typical structure to accomplish this purpose is one in which the conductor for the internal half-cell is sealed in a glass tube which is mounted in the tubular stem of the glass electrode and sealed to the lower portion thereof adjacent the ion sensitive bulb by cement or a suitable epoxy. The use of cement or other such sealing materials, however, makes the electrode unsuitable for use at elevated temperatures and pressures. What is desired, therefore, is an electrode structure in which the internal half-cell is sealed into the lower portion of the glass electrode by a glass ring seal. However, by presently known methods, the forming of such a seal adjacent to the ion sensitive bulb oftentimes results in the bulb cracking from the stem and, therefore, rendering the electrode inoperable.

It is, therefore, the principal object of the present invention to provide an electrochemical electrode assembly in which the internal half-cell is sealed by a glass ring seal close to the ion sensitive bulb of the assembly without cracks forming adjacent to the bulb.

Another object of the invention is to provide an all glass construction electrochemical electrode assembly which is simpler and more economical to construct than existing forms of such assemblies.

According to the principal aspect of the present invention, an internal half-cell of a glass electrode is sealed by a glass ring seal to the stem of the electrode close to the ion sensitive bulb by the use of wave energy. By utilizing wave energy rather than a flame as normally used in the construction of glass electrodes, heat may be directed specifically to the point where the internal electrode conductor is sealed to the glass structure of the electrode assembly so that heat is not transferred to the seal between the ion sensitive bulb and the stem which often results in the bulb cracking from the stem. Also, since a flame is not utilized for forming the glass ring seal for the conductor of the internal half-cell, the lower portion of the electrode may be filled with suitable electrolyte solution without the solution being contaminated by organic constituents which may occur when the sealing is accomplished by utilizing a flame such as a natural gas flame, and without burning the organic buffer in the electrolyte solution.

Other objects, aspects and advantages will become apparent from the following description taken in connection with the accompanying drawings wherein:

FIG. 1 is an elevation, partially in section, of one embodiment of the electrode assembly of the invention;

FIG. 2 is an elevation, in section, of the stem of the electrode illustrated in FIG. 1;

FIG. 2a is an elevation, in section, of two parts which may be sealed together to form the stem illustrated in FIG. 2;

FIG. 2b is an elevation, in section, of two parts of different configuration from those shown in FIG. 2a which also may be sealed together to form the stem in FIG. 2;

FIG. 3 is an elevation, in section, showing the stem having an ion sensitive bulb sealed thereto;

FIG. 4 is an elevation of the internal half-cell subassembly prior to mounting in the stem;

FIG. 5 shows the structure of FIG. 3 filled with electrolyte and the subassembly of FIG. 4 disposed therein prior to sealing the conductor for the half-cell to the stem;

FIG. 5a is a fragmentary partial sectional view, somewhat enlarged, of the intermediate portion of the assembly shown in FIG. 5 and illustrating how the glass ring seal for the conductor of the internal half-cell is formed;

FIG. 6 is an elevation, in section, of an additional embodiment of the invention; and FIG. 7 is an elevation, in section, of still another embodiment of the invention in which the assembly incorporates both a glass electrode and a reference electrode.

Referring now to the drawings in detail, wherein like reference characters designate like or corresponding parts throughout the various views, there is shown in FIG. 1 one embodiment of the invention in which the electrochemical electrode assembly is a glass electrode, referred to by numeral 10. The electrode has a stem 12 formed of two parts, an outer glass tube 14 and an inner glass tube 16 sealed to the outer tube by a glass ring seal 18 a short distance from the end 20 of the stem to which an ion sensitive bulb 22 is sealed. A cap 24 closes the other end of the stem 12.

As seen in FIG. 1, the inner glass tube 16 is narrowed down to a constriction 26 which is closed and sealed to a wire 28 terminating in an internal half-cell 30. The bulb 22 and lower portion of the stem 12 is filled with a suitable electrolyte 32 in which the half-cell is immersed. The end of the wire 28 above the constriction 26 is attached by a solder connection 34 to a conductor 36 of a cable 38 which extends through the cap 24 for connection to a conventional high impedance amplifier such as a pH meter. Thus, by the construction shown in FIG. 1, the electrolyte 32 is sealed in the lower portion of the glass electrode and, therefore, does not require replacing, and the conductor 28 for the internal half-cell 30 is sealed by glass to the stem 12 via the tube 16 to provide a rugged structure which is suitable for use at high temperatures and pressures. In fact, the electrode assembly can be steam sterilized without any adverse effects if the cap is suitably sealed to the tube 14.

In order to construct the assembly illustrated in FIG. 1, the stem 12, illustrated in FIG. 2, must be formed. The stem 12 may be formed in two different manners. As shown in FIG. 2a, the stem 12 may be formed by sealing the lower end 40 of a glass tube 42 to the annular surface 44 of a glass part 46 having its upper portion 48 narrowed down to a constriction 26. This seal may be effected by positioning the end 40 of the tube 42 adjacent the surface 44 and heating the two parts in a flame while rotating the parts about their axis on a glass lathe or by lamp working techniques.

The stem 12 in FIG. 2 may also be formed by sealing the outer edge 50 of the narrowed down glass part 52 to the inner surface of a glass tube 54 by rotating the two parts about their axis in a flame.

As the next step, the ion sensitive bulb 22 is sealed to the end 20 of the stem 12 as shown in FIG. 3. This may be accomplished by dipping the end 20 of the stem 12 in a molten body of ion sensitive glass, raising the end of the stem so that a droplet of the molten glass adheres thereto and then blowing through the other end of the stem to expand the glass droplet into an ion sensitive bulb. This method is described in greater detail in U.S. Pat. No. 2,346,470 to Cary et al. Other methods for forming bulbs, as are well known in the art, may also be utilized if desired. Since the inner tube 16 of the stem 12 is sealed to the outer tube 14 at a short distance from the end of the stem 12, the heat applied to the end of the tube upon dipping the same in the molten ion sensitive glass does not transfer to the glass ring seal 18 which might otherwise result in strains being created in the glass assembly without the additional step of reheating the seal 18.

FIG. 4 illustrates the internal half-cell assembly 55 used in the electrode of the invention. As stated before, the internal half-cell 30 is formed at the end of a wire 28. Preferably, the wire 28 is of platinum. A bead of glass 56 is sealed to and surrounds the upper portion of the wire 28 and a coating of silver and silver chloride is applied to the end of the wire to form the half-cell 30. The glass 56 must be one which has a coefficient of thermal expansion approximating that of the wire 28. Where the wire 28 is platinum, Corning 0010 or 0120, lead glasses are suitable for the bead 56. If desired, rather than providing a platinum wire coated with silver and silver chloride for the assembly 55, a silver wire (not shown) may be welded to the platinum wire 28 just below the glass bead 56 and the end of the silver wire coated with silver chloride to form the half-cell 30. The next step of forming the electrode requires the supplying of electrolyte to the lower portion of the stem 12 adjacent the bulb 22, which may be accomplished by inserting the needle of a syringe carrying electrolyte through the constriction 26 of the tube 16. After the electrolyte is supplied to the lower portion of the stem 12, the half-cell assembly 55 is mounted in the stem as shown in FIG. 5 with the half-cell 30 immersed in the electrolyte 32 and the bead 56 resting upon the open constricted end of the tube 16. If desired, the conductor 36 of cable 38 is soldered to the end of wire 28 prior to positioning the assembly 55 in the stem.

The next step is to effect the fusion of the glass bead 56 to the end of the tube 16 to thereby seal the wire 16 into the stem 12. According to one important feature of the invention, this fusion is effected by utilizing wave energy and directing said energy specifically to the point where the fusion is desired. The use of a flame in the present arrangement would be virtually impossible since a flame cannot be maintained within a closed area, such as inside the stem 12, with conventional burners. Moreover, even if a flame could be maintained by a burner inserted through the open end of the stem 12, organic constituents in the flame would contaminate the electrolyte solution 32 in contact with the bulb 22 and the flame would burn the organic buffer normally contained in the solution. Also, since the flame produces heat in a wide area, sufficient heat might be transferred through the glass ring seal 18 to cause strains at that point and therefore weaken the structure, or possibly damage the ion sensitive bulb 22.

One form of wave energy that may be utilized to seal the bead 56 to the constriction 26 is electromagnetic energy by means of an induction heater 58 as seen in FIG. 5a. The induction heater includes an induction coil 60 having its ends connected to a suitable power source, not shown. In order to direct the electromagnetic energy of the induction heater to the point within the stem assembly 12 where the fusion is desired to take place, an electrically conductive sleeve 62 is positioned on top of the glass bead 56. Preferably, the sleeve 62 is formed of graphite or carbon and has a threaded section 64 received in a threaded opening 66 in the end of an elongated tool 68 formed of nonconductive material such as ceramic. The tool has a passage 70 therethrough in which the end of the wire 28 and cable 38 extend. The tool 68 is inserted through the upper open end of the stem 12 until a beveled end surface 71 of the sleeve 62 contacts the bead 56 and outer portion of the constriction 26. The electromagnetic energy generated by the induction heater 58 heats the sleeve 62 and effects a fusion of the bead to the constricted portion of the tube 16.

The fusion of the bead 56 to the tube 16 may also be accomplished by the use of sonic energy, rather than electromagnetic energy. In this case, a metal tool (not shown), having a collar of the configuration of the collar 62 may be inserted through the other open end of the stem 12 and positioned as shown in FIG. 5a and the sonic energy could be applied to the exposed end of the tool and transferred through the tool to the collar. Whether electromagnetic or sonic energy is used, the sealing of the bead 56 to the tube 16 is effected without damaging the outer glass tube of the stem 12 or without the transfer of substantial heat to adjacent glass ring seals which would result in strains being developed in the assembly.

Although the glass part 16 in which the wire 28 is fused is shown in the configuration of a tube flared at its lower end for connection to the outer tube 14, the part 16 may have different configurations, such as cup-shaped, or even be a substantially flat glass member extending across the tube 14 with an opening therein through which the wire 28 passes. The latter construction, however, would have the disadvantage that heat applied by wave energy to fuse the bead of glass 56 might transfer to the glass ring seal 18 and damage the same.

It can be appreciated from the above description that the invention provides an all glass, rugged glass electrode assembly which is formed with a minimum number of steps, even though the electrolyte 32 is sealed by a glass ring seal into the lower portion of the assembly. Also, by the construction of the invention, a completely smooth and continuous cylindrical surface is provided throughout the length of the electrode, therefore making it readily suitable for mounting in cylindrical sealing members for pipes or chambers, which cannot be accomplished by many electrodes available today having irregular surface configurations.

FIG. 6 shows a slightly different form of the invention in which the bottom of the outer tube 14 is sealed to the bottom of the inner tube 16 by the glass ring seal 18, rather than the tubes being sealed together above the bottom of the outer tube 14 as in the embodiment of the invention illustrated in FIG. 1. In this case, the bottom of the stem 12 terminating in the glass ring seal 18 is dipped in molten ion sensitive glass to form the bulb 22. As indicated before, the forming of the bulb adjacent to the seal 18 may, in some cases, result in undesirable strains being formed in the seal. However, with sufficient skill of the operator and proper preheating of the seal 18, bulbs can be blown on the end of the stem 12 in FIG. 6 as described above. A preferred method for forming the bulb 22 at the ends of tubes 12 and 14 as shown in FIG. 6 is described in our copending patent application entitled ELECTRODE AND METHOD OF MAKING SAME Ser. No. 518,278 assigned to the assignee of this application filed Jan. 3, 1966, now U.S. Pat. No. 3,444,068. The half-cell assembly is sealed in the tube 16 in the same manner as described in connection with FIG. 5a above. The resulting structure has the advantage that the annular chamber 72 defined between the lower portion of the outer tube 14 and the outer surface of the tube 16 terminates closely adjacent to the bulb 22. Consequently, a metallic sleeve 74 may be positioned in the tube 14 and extend to the bottom of the annular chamber 72 to provide electrostatic shielding for the conductor connected to the half-cell 30, closer to the ion sensitive bulb than has heretobefore been possible. The cable in this embodiment of the invention includes a metallic shield 76 surrounding the inner insulated conductor 38, which in turn is surrounded by an insulating sleeve 78. A portion of the metallic shield 76 is connected to the metallic shielding sleeve 74 by solder 82, assuming of course that the associated measuring circuit allows this connection. It is to be understood that the metallic sleeve 74 and shield 76 for the cable as shown in FIG. 6 may also be incorporated in the electrode assembly illustrated in FIG. 1 in the same fashion to provide electrostatic shielding for the conductors therein.

In some cases, it is desirable to mount a temperature sensitive element in a glass electrode for thermal compensation. Such an element is generally designated by numeral 82 in FIG. 6. The temperature responsive element may be a thermistor or, as shown, be a spool 84 of nonconductive material surrounding the inner glass tube 16 and having a wire 86 wound thereon. The ends of the wire 86 are covered with layers of insulation 88 and 90 and pass through the insulation 78 for connection to a suitable electrical circuit. Since bulb 22 is sealed to the bottom ends of tubes 14 and 16, the temperature responsive element 82 may be incorporated adjacent to the ion sensitive bulb 22 for detecting temperature conditions closely adjacent to the bulb.

Another embodiment of the invention is illustrated in FIG. 7. This embodiment is a combination glass-reference electrode assembly having an outer glass tube 92 and an inner glass tube 94 sealed together at their lower ends by a glass ring seal 96 and at their upper ends by a glass ring seal 98. An ion sensitive bulb 100 is formed at the ends of the tubes 92 and 94 in the same manner as the bulb described in connection with the assembly illustrated in FIG. 6.

The tube 94 has a constriction 102 above the seal 96 into which there is mounted a half-cell subassembly comprising a platinum wire 104 terminating in a half-cell 106 and a bead of glass sealed to the wire 104. The bead is fused to the constriction 102 by use of a tool 68 and induction heater 58 as shown in FIG. 5a or by other wave energy producing means. In this case, the induction coil surrounds the outer tube 92 with the collar 62 of the tool 68 positioned on top of the glass bead 108. A conductor 110 is connected to the end of the wire 104 and extends upwardly through the tube 110 for connection to a suitable cable mounted in a cap, not shown. The half-cell 106 is immersed in a body of electrolyte 112 which is supplied to the tube 94 prior to mounting of the half-cell therein.

The outer tube 92 also contains a body of electrolyte 114 in which there is immersed a second half-cell 116 containing a conductor 118 sealed in the upper portion of the glass assembly at the time the glass ring seal 98 is formed. The cap and cable has been omitted from FIG. 7 in order to clearly show the construction of the upper portion of the glass assembly. A liquid junction structure 120 is located in the lower portion of the outer tube 92 closely adjacent to the ion sensitive bulb 100 for providing a slow leak of electrolyte 114 from tube 92 to the sample, thereby providing electrolytic communication between the half cell 116 and sample as is well known in the electrochemical art. The outer tube 92 has a port 124 therein closed by a rubber or plastic cap 126 which may be removed for replenishing the supply of electrolyte 114 in the assembly.

By the construction of the combination electrode in FIG. 7, the electrolyte solution 114 extends down in the assembly to a point adjacent to the ion sensitive bulb 96 so as to provide electrostatic shielding for the conductors 104 and 110 of the half-cell 106. Also, due to the construction at the lower portion of the assembly, the liquid junction structure 120 is positioned closer to the ion sensitive bulb 100 than can be accomplished by presently known designs. Furthermore, the electrolyte 112 for the glass electrode portion of the assembly is sealed in the lower portion of the tube 94, but in such a manner as to not produce undesired strains within the glass ring seal 96, thereby providing a rugged glass structure which is capable of withstanding high temperatures and pressures.

Although glass has been described as the material utilized for the construction of the electrochemical assembly of the invention, it is to be understood that other ceramic materials having high resistance to temperatures and corrosion could be utilized in place of glass.

Although several embodiments of the invention has been disclosed herein for purposes of illustration, it will be understood that various changes can be made in the form, details, arrangement and proportions of the various parts in such embodiments without departing from the spirit and scope of the invention as defined by the appended claims.

What is claimed is:

1. An electrochemical electrode assembly comprising:
   inner and outer glass tubes spaced apart to define an annular chamber;
   a glass ring seal sealing said tubes to each other adjacent one end thereof;
   an ion sensitive bulb sealed to at least one of said tubes at said one end;

an electrolyte filling said bulb;
said inner tube having a constriction therein intermediate said glass ring seal and the other end of said outer tube;
an internal half-cell immersed in said electrolyte;
a wire extending through said constriction and being connected to said half-cell;
a second glass seal sealing said wire in said constriction; and
said outer glass tube being devoid of a concentric glass ring seal between said glass ring seal and the other end of said outer tube.

2. An electrochemical electrode assembly comprising:
inner and outer glass tubes spaced apart to define an annular chamber;
a glass seal sealing said tubes to each other adjacent one end thereof;
an ion sensitive bulb sealed to said glass seal;
an electrolyte filling said bulb;
said inner tube having a constriction therein intermediate said glass seal and the other end of said outer tube;
an internal half-cell immersed in said electrolyte;
a wire extending through said constriction and being connected to said half-cell;
a second glass seal sealing said wire in said constriction; and
said outer glass tube being devoid of a concentric glass ring seal between said first mentioned glass seal and the other end of said outer tube.

3. An electrode as set forth in claim 1 wherein said inner and outer glass tubes are devoid of a glass sealed electrolyte filling opening other than that provided by said second glass seal sealing said wire in said constriction.

4. An electrode as set forth in claim 3 wherein said wire is solid.

5. A method of producing an electrochemical electrode assembly comprising the steps of:
providing a wire having an internal half-cell at one end thereof;
forming an assembly having spaced inner and outer glass tubes with a glass seal sealing said tubes to each other adjacent one end thereof, and said inner tube having a constriction therein intermediate the ends of said outer tube;
forming a bulb of ion sensitive glass on said assembly adjacent to said one end so as to close said inner tube at said end;
substantially filling said bulb through the constriction in said inner tube with electrolyte;
positioning said wire through said constriction so that said half-cell will be immersed in the electrolyte in said bulb; and
thereafter sealing said wire in said constriction by inserting an electrically conductive element into said assembly through the other end thereof so as to be positioned immediately adjacent to said constriction and by applying wave energy to said element.

6. A method as set forth in claim 5 wherein said electrically conductive element has an opening therethrough, and said wire is caused to pass through said opening when said element is inserted into said assembly whereby said element surrounds said wire.

7. A method as set forth in claim 5 wherein said wire is sealed in said constriction by surrounding the outer tube with an induction heater coil adjacent to said element to transfer electromagnetic energy to said element.

* * * * *